United States Patent [19]

Hoffmann et al.

[11] Patent Number: 5,608,800
[45] Date of Patent: Mar. 4, 1997

[54] PROCESS FOR DETECTING UNAUTHORIZED INTRODUCTION OF ANY DATA TRANSMITTED BY A TRANSMITTER TO A RECEIVER

[75] Inventors: Gerhard Hoffmann, München; Klaus Lukas, Ingolstadt; Stephan Lechner, München; Ferdinand Steiner, München; Helmut Baumgärtner, München; Ekkehard Löhmann, Bonn; Matthias Leclerc, Frankfurt, all of Germany

[73] Assignees: Siemens Aktiengesellschaft, Munich; Siemens Nixdorf Informationssysteme AG, Paderborn, both of Germany

[21] Appl. No.: 318,700

[22] PCT Filed: Mar. 17, 1993

[86] PCT No.: PCT/DE93/00246

§ 371 Date: Oct. 11, 1994

§ 102(e) Date: Oct. 11, 1994

[87] PCT Pub. No.: WO93/21711

PCT Pub. Date: Oct. 28, 1993

[30] Foreign Application Priority Data

Apr. 9, 1992 [DE] Germany .......................... 42 11 989.8

[51] Int. Cl.⁶ ................. H04L 9/08; H04L 9/14; H04K 1/00
[52] U.S. Cl. ................. 380/25; 380/23; 380/24; 380/21; 395/187.01
[58] Field of Search .................. 380/23, 24, 25, 380/21; 395/187.01

[56] References Cited

U.S. PATENT DOCUMENTS

| 4,264,782 | 4/1981 | Konheim | 178/22 |
| 4,281,215 | 7/1981 | Atalla. | |
| 4,423,287 | 12/1983 | Zeidler | 178/22.08 |
| 4,578,530 | 3/1986 | Zeidler. | |
| 4,649,233 | 5/1987 | Bass et al. | 380/21 |
| 4,850,017 | 7/1989 | Matyas et al. | 380/21 |
| 4,853,962 | 8/1989 | Brockman | 380/44 |
| 4,924,515 | 5/1990 | Matyas et al. | 380/25 |
| 4,975,950 | 12/1990 | Lentz | 380/4 |
| 5,018,196 | 5/1991 | Takaragi | 380/30 |
| 5,113,444 | 5/1992 | Vobach | 380/23 |
| 5,136,642 | 8/1992 | Kawamura et al. | 380/21 |
| 5,142,578 | 8/1992 | Matyas et al. | 380/21 |
| 5,189,700 | 2/1993 | Blandford | 380/23 |
| 5,193,115 | 3/1993 | Vobach | 380/46 |

(List continued on next page.)

FOREIGN PATENT DOCUMENTS

| 0117907 | 9/1984 | European Pat. Off. . |
| 0197392 | 10/1986 | European Pat. Off. . |
| 0246823 | 11/1987 | European Pat. Off. . |

*Primary Examiner*—Thomas H. Tarcza
*Assistant Examiner*—Hrayr A. Sayadian
*Attorney, Agent, or Firm*—Hill, Steadman & Simpson

[57] ABSTRACT

The process is intended to establish whether the data transmitted by the transmitter (SE) to the receiver (EM) have been tapped and spuriously reintroduced at a later point in time and/or have been inadmissibly altered. For this purpose, the signature (S) assigned to the useful data (D) is enciphered symmetrically, using a combination of coupling data (K), characterizing the coupling between transmitter and receiver, and random data (Z), generated by a random generator. The coupling data are transmitted in plain text, the random data are enciphered. On the receiver side it can be established whether the transmitted message has been tapped and reintroduced at a later point in time if the coupling data are inadmissible. An alteration of the transmitted message can be established from ascertaining that the key used for enciphering the signature, obtained from the combination of coupling data and random data with the aid of a one-way function, does not correspond to the key obtained during deciphering at the receiver and consequently the deciphering of the enciphered signature leads to an incorrect result. The incorrect signature is detected during verification of the signature.

11 Claims, 4 Drawing Sheets

U.S. PATENT DOCUMENTS

| | | | |
|---|---|---|---|
| 5,204,961 | 4/1993 | Vobach | 395/725 |
| 5,222,137 | 6/1993 | Barrett et al. | 380/21 |
| 5,267,314 | 11/1993 | Stambler | 380/24 |
| 5,293,029 | 3/1994 | Iijima | 235/380 |
| 5,307,412 | 4/1994 | Vobach | 380/42 |
| 5,335,280 | 8/1994 | Vobach | 380/42 |
| 5,349,642 | 9/1994 | Kingdon | 380/25 |
| 5,524,073 | 6/1996 | Stambler | 380/24 |
| 5,555,303 | 9/1996 | Stambler | 380/25 |

PROCESS FOR DETECTING UNAUTHORIZED INTRODUCTION OF ANY DATA TRANSMITTED BY A TRANSMITTER TO A RECEIVER

BACKGROUND OF THE INVENTION

1. Field of the Invention

The present invention provides a method of checking transmitted encrypted data for unauthorized introduction of data.

2. Description of the Related Art

It is known to protect the data to be transmitted by a transmitter to a receiver against unauthorized attack by the data being enciphered. For example, H. Sedlak, U. Golze, Ein Public-Key-Code Kryptographie-Prozessor (A Public-Key-Code Cryptography Processor), Informationstechnik it, 28th year, Issue 3/1986, pages 157, 158 gives an introductory description of the possibilities of safeguarding data to be transmitted by a transmitter to a receiver. In this case, both the transmitter and the receiver may be a computer. The enciphering or safeguarding is intended to have the result that the authenticity of the sender and protection of the message or of the data against manipulation are achieved. For this purpose, the messages to be transmitted can be enciphered, or encrypted, for example on the basis of an asymmetric or symmetric enciphering method. Asymmetric encryption or enciphering means in this case that two different keys are used for enciphering and deciphering. It is similarly possible to use the same key both in the case of the receiver and in the case of the transmitter, a symmetric enciphering thereby being achieved. In the case of the asymmetric methods, it is possible that a key cannot be calculated from the other key without additional information. Therefore, one of the two keys may be published. This method is also known as the public-key method.

The message to be transmitted usually comprises useful data and a signature developed from the useful data.

The signature is an extract of the useful data enciphered with the sender key. With the aid of the receiver key, it can then be established whether the deciphered signature can be developed from the transmitted useful data. FIG. 1 shows this principle. At the transmitter SE, the useful data D are digitally appended with a signing key before sending. The signature S is obtained. The useful data are then transmitted together with the signature to the receiver EM. With the aid of the corresponding verification key, the receiver EM checks the integrity of the message comprising useful data and signature and the authenticity of the appended signature.

A potential attacker may tap the data traffic and spuriously reintroduce the tapped data together with the signature at the recipient's premises or at some other place in possession of the verification key. The recipient has no possible way of detecting from the signature whether the data are original or are spuriously introduced data.

SUMMARY OF THE INVENTION

The problem underlying the invention is to provide a process in which the recipient can detect whether the data received are data transmitted directly from the transmitter or are data introduced by an attacker without authorization. This problem is solved by a process for detecting unauthorized introduction of any data transmitted by a transmitter to a receiver, in which the data comprise useful data and a signature developed from the useful data, in which the signature is symmetrically enciphered and the key used for this purpose is dependent on coupling data designating the transmission between transmitter and receiver.

The process according to the invention is substantially based on a symmetric enciphering of the signature. By this enciphering, a forgery-proof coupling of the signature to a particular data exchange between transmitter and receiver can be achieved.

For this purpose, it is advantageous to allow so-called coupling data, from which unauthorized reintroduction can be detected, to go into the key used in the enciphering of the signature. Such coupling data may, for example, be an identification of the recipient or the time of the data transmission. The coupling data may be transmitted in addition to the useful data and the enciphered signature to the recipient in plain text for checking.

In order furthermore to prevent unauthorized recovery of the original signature, random data additionally generated by the transmitter go into the key for enciphering the signature. These random data may likewise be transmitted to the receiver, in an enciphered form. For enciphering the random data, a so-called transfer key may be used, which may be both a symmetric key and an asymmetric key.

A random number generator may be available at the transmitter. The enciphering of the signature may be performed using a one-way function which is shared by transmitter and receiver and may also be publically known. Finally, transmitter and receiver share a secret key if symmetric enciphering methods are used or a pair of keys if asymmetric encrypting or enciphering methods are used.

Further developments of the invention include that the coupling data are dependent on the time of transmission of the data and/or on the receiver. The coupling data may be transmitted in plain text to the receiver.

The process provides that the key is additionally influenced at the transmitter by random data or pseudo-random data. The random data are transmitted to the receiver in enciphered form with a transfer key. The random data are generated, the coupling data are established, a symmetric key is generated by one-way enciphering of the combination of random data and coupling data, the signature is enciphered with the aid of the key, the random data are enciphered with the transfer key, a message comprising the useful data, the enciphered signature, and the coupling data and the enciphered random data is transmitted. Preferably, the coupling data are checked on the receiver side and, if there is a discrepancy, the message is rejected, the random data are recovered by deciphering with the transfer key the enciphered random data obtained, the symmetric key is determined by one-way enciphering of the combination of the calculated random data and coupling data obtained, the signature is recovered by deciphering the enciphered signature with the aid of the calculated key, the signature is checked and, if errors are established, the message is rejected.

The process provides that a symmetric key is used as the transfer key. Alternately, an asymmetric key is used as the transfer key, proceeding on the basis of the public-key method.

The signature may be replaced by a check sum of the useful data. The useful data may be replaced by protocol data or a combination of protocol data and useful data.

BRIEF DESCRIPTION OF THE DRAWINGS

The invention is explained further with reference to an exemplary embodiment, which is represented in the figures, in which.

DETAILED DESCRIPTION OF THE PREFERRED EMBODIMENTS

Figure 1:
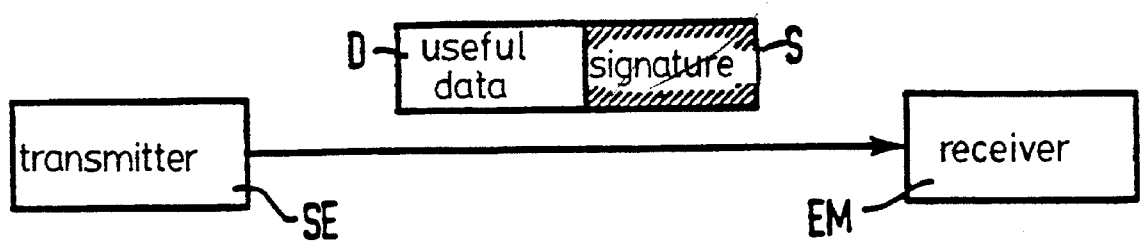
FIG. 1 is a schematic diagram showing the transmission of useful data with a signature according to the prior art.
Figure 2:
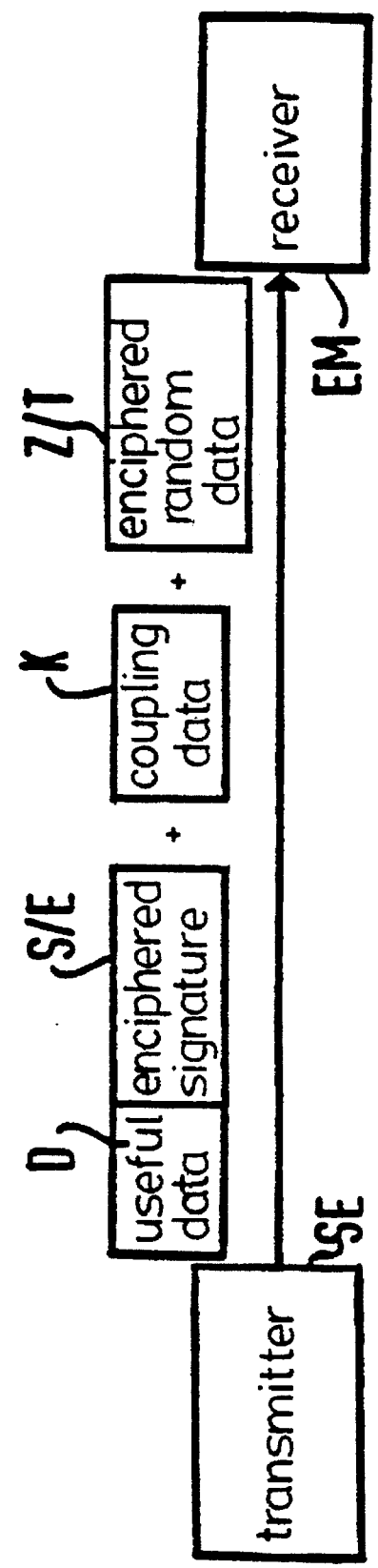
FIG. 2 shows a basic diagram of the message transmitted from transmitter to receiver.

On the basis of FIGS. 1 and 2, useful data D are to be transmitted by a transmitter SE to a receiver EM. On the transmitter side, the following data are available: useful data D and the associated signature S as well as a transfer key T, which permits a confidential transmission of the random data Z. The transmission may be performed, for example, via a transmission line. In order to safeguard the transmission of the useful data, a signature S is used, which has been converted to the enciphered signature S/E. In addition to the useful data D and the enciphered signature S/E, coupling data K and enciphered random data Z/T may be transmitted to the receiver EM. The message transmitted by the transmitter SE to the receiver EM consequently comprises useful data D, enciphered signature S/E, coupling data K and enciphered random data Z/T.

Figure 3:
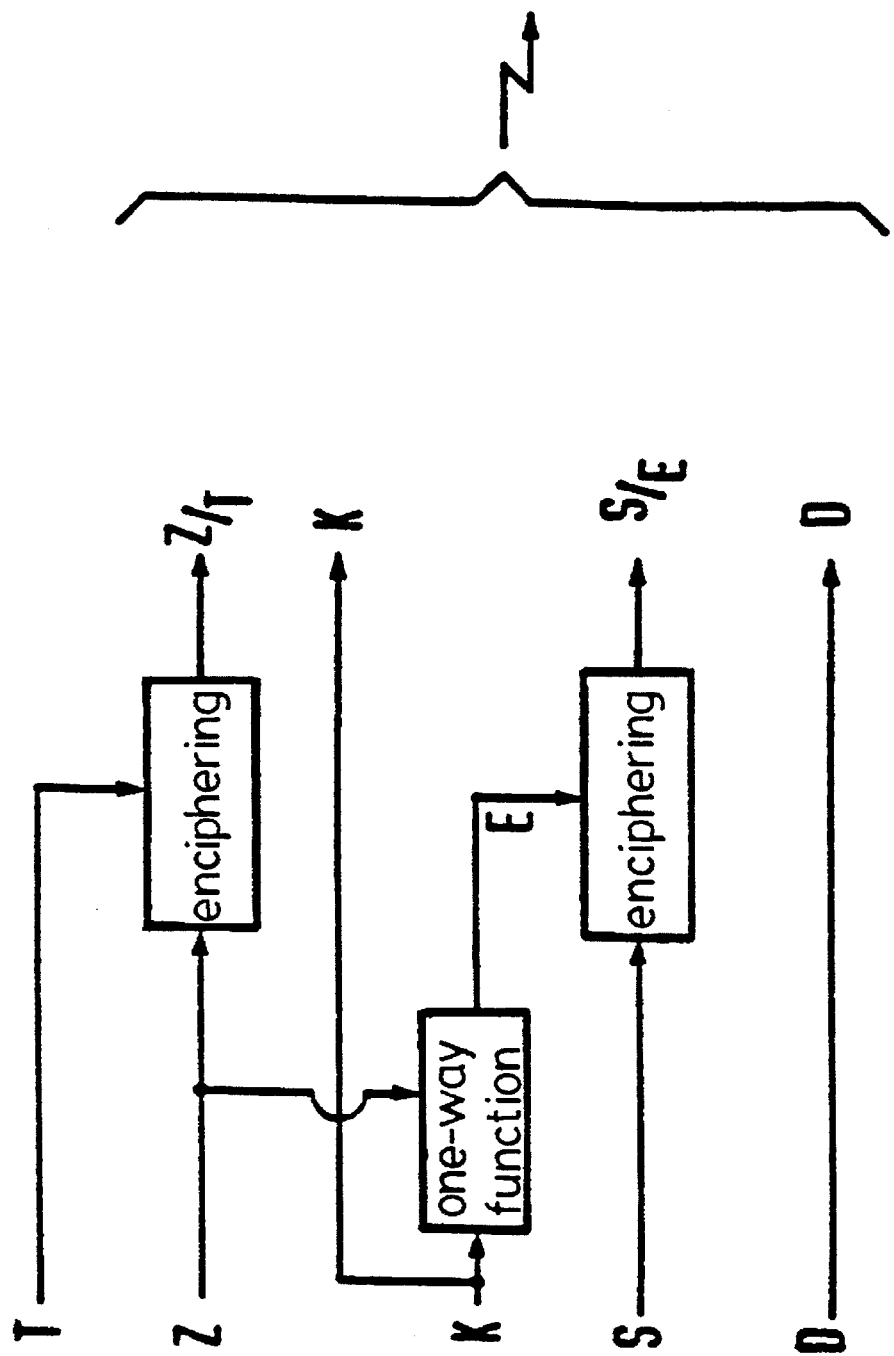
FIG. 3 shows a diagram of the protection algorithm on the transmitter side.

According to FIG. 3, the message to be transmitted by the transmitter SE to the receiver EM is generated in the following way:

1. First of all, random data Z are generated by a random data generator at the transmitter.
2. Furthermore, coupling data K are established.
3. From a combination of random data Z and coupling data K, a symmetric key E is generated by one-way enciphering. The one-way function used for this purpose may be publically known.
4. With the aid of the key E, the signature S is symmetrically enciphered and the enciphered signature S/E is generated.
5. Furthermore, with the aid of a transfer key T, the random data Z are enciphered to form enciphered random data Z/T.
6. Subsequently, the message can be transmitted by the transmitter to the receiver, comprising useful data D, enciphered signature S/E, coupling data K and enciphered random data Z/T.

Figure 4:
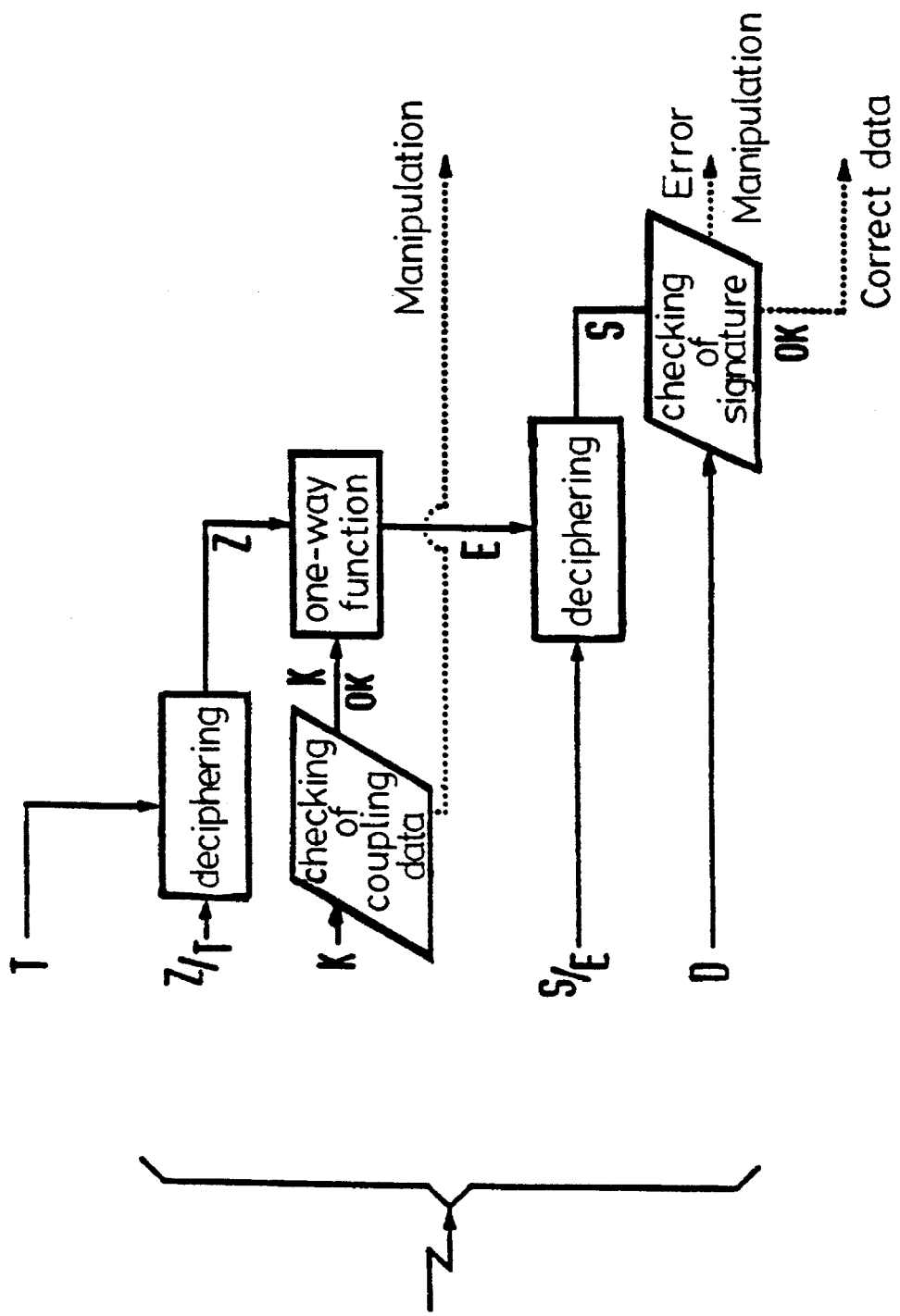
FIG. 4 shows a diagram of the protection algorithm on the receiver side.

Consequently, according to FIG. 4, on the receiver side EM there is available a message which comprises useful data D, enciphered signature S/E, coupling data K, enciphered random data Z/T, and there is also a corresponding transfer key T.

For checking the message transmitted, the following steps are then carried out:

1. The coupling data K are investigated for plausibility. If the check reveals discrepancies, the message is rejected. In the plausibility check, it is thus checked whether the coupling data can be correct. Examples of coupling data are dealt with further below.
2. The random data Z are recovered by deciphering the enciphered random data Z/T with the aid of the transfer key T.
3. Using a one-way enciphering, the symmetric key E used is determined from the calculated random data Z and the coupling data K obtained.
4. By deciphering the enciphered signature S/E with the aid of the calculated key E, the signature S is recovered.
5. The signature S is checked. If the check reveals errors, the message is rejected.

The coupling data K and the random data Z/T cannot be falsified without detection. Falsification is noticed at the latest during the checking of the signature by the receiver EM. A modification of the coupling data K and of the enciphered random data Z/T namely results at the receiver in a falsified symmetric key E; the deciphering of the enciphered signature S/E with the falsified key E' results in an invalid signature S'. This is finally detected when verifying the signature S' and is rejected as a falsification.

A spurious reintroduction of the message can be detected by the receiver EM from the coupling data K. Which specific spurious reintroduction attacks can be repulsed depends on the choice of coupling data. The effects of certain entries in the coupling data are to be explained with reference to a number of examples.

If the coupling data comprise an empty entry, there is an implicit coupling of the useful data provided with the signature to the owners of the transfer key. The tapped data cannot be introduced without detection in the case of systems which are not in possession of the transfer key.

The coupling data may comprise an entry of the recipient's name. Then the recipient can check whether the message really was intended for him or whether the message was originally directed to some other addressee, has been tapped and reintroduced. The recipient cannot check, however, whether the message was already sent to him at some earlier point in time.

The coupling data may comprise an entry of the transmission time. Each of the recipients can then check whether the message is current or whether it is a spurious reintroduction of information from before. However, the data traffic could be tapped and reintroduced virtually simultaneously at some other place.

An arbitrary combination of various entries in the coupling data is possible. If a number of entries are combined in the coupling data, all the entries must be checked with regard to their plausibility. Only if all the checks are positive is the message accepted. The more items of information transmitted together in the coupling data, the stronger the coupling of the data with appended signature to a specific order.

By the use of random data Z which go into the key E, it can be established whether the message has been altered on the way from the transmitter to the receiver. Since the random data are transmitted in enciphered form and both the random data and the coupling data go into forming of the key E, each alteration of the message transmitted can be established.

Both a symmetric key and an asymmetric key can be used as the transfer key. For the case in which both parties involved in communication mutually exchange signed data and thereby use a public-key method, the signing and verification keys used may also be used as the transport key. When enciphering the random data on the transmitter side, the public key of the receiver serves as the transfer key. When deciphering the random data on the receiver side, the private key of the receiver serves as the transfer key.

The process according to the invention can also be used for check sums of data. Instead of the signature, the corresponding check sum is symmetrically enciphered. The individual process steps in enciphering and deciphering the check sum remain unchanged.

Although other modifications and changes may be suggested by those skilled in the art, it is the intention of the inventors to embody within the patent warranted hereon all changes and modifications as reasonably and properly come within the scope of their contribution to the art.

We claim:

1. A process for detecting unauthorized reintroduction of any data transmitted by a transmitter to a receiver, the process comprising the steps of:

developing a signature from the data in the transmitter, symmetrically encrypting the signature in the transmitter using a key which is dependent on coupling data designating a transmission between the transmitter and the receiver, including:
   generating random data in the transmitter,
   establishing the coupling data,
   generating a symmetric key by one-way enciphering of a combination of random data and coupling data in the transmitter,
   enciphering the signature with an aid of the key in the transmitter,
   enciphering the random data with a transfer key in the transmitter, transmitting a message comprising the useful data, the enciphered signature, the coupling data and the enciphered random data from the transmitter to the receiver, checking the message to determine if errors are present in the message, and rejecting the useful data if errors are present.

2. A process as claimed in claim 1, wherein said coupling data are dependent on a time of transmission of the data.

3. A process as claimed in claim 1, further comprising the step of:

transmitting the coupling data in plain text to the receiver.

4. A process as claimed in claim 1, wherein the step of checking the message further comprises the steps of:

checking the coupling data on a receiver side and, if there is a discrepancy, rejecting the message,
   recovering the random data by deciphering with the transfer key the enciphered random data,
   determining the symmetric key by one-way enciphering of a combination of the calculated random data and coupling data,
   recovering the signature by deciphering the enciphered signature with the aid of the calculated key,
   checking the signature and, rejecting the message if errors are detected.

5. A process as claimed in claim 1, further comprising the step of:

using a symmetric key as the transfer key.

6. A process as claimed in claim 1, further comprising the step of:

using an asymmetric key as the transfer key, proceeding on a basis of the public-key method.

7. A process as claimed in claim 1, further comprising the step of:

replacing the signature by a check sum of the useful data.

8. A process as claimed in claim 1, wherein said coupling data are dependent on the receiver.

9. A process as claimed in claim 1, further comprising the step of:

influencing the key at the transmitter by pseudo-random data.

10. A process for detecting unauthorized reintroduction of any data transmitted by a transmitter to a receiver, comprising the steps of:

developing a signature from protocol data wherein the data are protocol data;
    symmetrically enciphering the signature using a key which is dependent on coupling data designating the transmission between the transmitter and the receiver, including:
    generating random data in the transmitter,
    establishing the coupling data,
    generating a symmetric key by one-way enciphering of a combination of random data and coupling data in the transmitter,
    enciphering the signature with an aid of the key in the transmitter,
    enciphering the random data with a transfer key in the transmitter, and
    transmitting a message including the data and the signature to the receiver, and
    checking the message and rejecting the message if errors are present.

11. A process for detecting unauthorized reintroduction of any data transmitted by a transmitter to a receiver, comprising the steps of:

developing a signature from a combination of protocol data and useful data;
    symmetrically enciphering the signature using a key which is dependent on coupling data designating the transmission between the transmitter and the receiver, including:
    generating random data in the transmitter,
    establishing the coupling data,
    generating a symmetric key by one-way enciphering of a combination of random data and coupling data in the transmitter,
    enciphering the signature with an aid of the key in the transmitter,
    enciphering the random data with a transfer key in the transmitter, and
    transmitting a message including the data and the signature to the receiver, and
    checking the message and rejecting the message if errors are present.

* * * * *